United States Patent
Chien

(10) Patent No.: US 12,445,430 B2
(45) Date of Patent: Oct. 14, 2025

(54) AUTOMATIC DISCOVERY OF ACCESS POINT CONTROLLER

(71) Applicant: Ruckus IP Holdings LLC, Claremont, NC (US)

(72) Inventor: Cheng-Ming Chien, New Taipei (TW)

(73) Assignee: Ruckus IP Holdings LLC, Claremont, NC (US)

( * ) Notice: Subject to any disclaimer, the term of this patent is extended or adjusted under 35 U.S.C. 154(b) by 526 days.

(21) Appl. No.: 17/957,388

(22) Filed: Sep. 30, 2022

(65) Prior Publication Data

US 2023/0164139 A1   May 25, 2023

Related U.S. Application Data

(60) Provisional application No. 63/281,135, filed on Nov. 19, 2021.

(51) Int. Cl.
*H04L 9/40* (2022.01)
*H04W 48/16* (2009.01)

(52) U.S. Cl.
CPC ........... *H04L 63/083* (2013.01); *H04W 48/16* (2013.01)

(58) Field of Classification Search
CPC .... H04W 48/16; G04L 9/0825; H04L 63/083; H04L 63/0807; H04L 63/0823; H04L 63/0876
See application file for complete search history.

(56) References Cited

U.S. PATENT DOCUMENTS

2010/0125903 A1*   5/2010   Devarajan ............. H04L 63/102
                                                    709/224

* cited by examiner

*Primary Examiner* — Diane D Mizrahi
(74) *Attorney, Agent, or Firm* — Myers Bigel, P.A.

(57) ABSTRACT

Methods, systems, and devices for facilitating automatic discovery of a controller device by one or more access points of a network, thereby providing a more secure and easier deployment of the access points. For example, a method may include receiving an indication of an authorization grant by a networking device; requesting, by the networking device, an authorization token from a remote authorization service; obtaining, by the networking device and from the remote authorization service, the requested authorization token; and transmitting, by the networking device and to a device registrar, a request to register the networking device with the device registrar, where the request includes the authorization token.

18 Claims, 4 Drawing Sheets

AUTOMATIC DISCOVERY OF ACCESS POINT CONTROLLER

CROSS-REFERENCE TO RELATED APPLICATION

The present application claims the benefit of priority to U.S. Provisional Application No. 63/281,135, filed on Nov. 19, 2021, and the entire contents of the above-identified application are incorporated by reference as if set forth herein.

TECHNICAL FIELD

Aspects of the present disclosure relate to methods, systems, and devices for automatic discovery of a controller device by one or more access points of a network.

BACKGROUND

Many electronic devices are capable of wirelessly communicating with other electronic devices. These electronic devices can include a networking subsystem that implements a network interface for a wireless local area network and/or another type of wireless network. For example, many electronic devices communicate with each other via wireless local area networks (WLANs) using one or more Institute of Electrical and Electronics Engineers (IEEE) 802.11-compatible communication protocols (which are sometimes collectively referred to as 'WiFi'). In a typical deployment, a WiFi-based WLAN includes one or more access points (or basic service sets or BSSs) that communicate wirelessly with each other and with other electronic devices using WiFi, and that provide access to another network (such as the Internet).

In some WiFi environments, such as enterprise WiFi networks where multiple access points are deployed, one or more controllers that manage the access points may be provided. The controller may be one of the access points, a different standalone device, or a software application available via a network (e.g., a cloud-based controller). The controller may control various aspects of the operation of the access points, and by extension, the wireless network. For example, the controller may provide configuration management, user authentication, events/alarms reports, statistics reports, and/or monitoring of access-point functions. Various protocols, such as LightWeight Access Point Protocol (LWAPP) or Control and Provisioning of Wireless Access Points (CAPWAP), may be used to facilitate communication between an access point and a controller.

An access point that is to be managed by a controller first needs to form a connection with the controller by locating or discovering the controller on a network. In some topologies, a network administrator may provide the controller network address (e.g., Internet Protocol (IP)) to the access point via a user interface, such as a web application or command line interface. Although this process is relatively straightforward, it may be time-consuming for large-scale networks having tens or hundreds of access points.

In order to reduce complexity and setup time in some deployments, such as large-scale deployments, an access point may be configured to discover its controller automatically or in an automated fashion, e.g., with minimal involvement from a human network administrator. For example, an access point may automatically discover the network address of a controller in the same subnet in the network, and the access point may then be automatically configured by its controller. A variety of techniques may be used to advertise the network address of a controller to an access point. For example, the address of the controller may be advertised by configuring the network, such as by registering the controller with a domain name server (DNS) or configuring the Dynamic Host Control Protocol (DHCP) server using a setting or configuration, such as DHCP option 43. However, these approaches usually require extra configuration of external servers (which provide the DHCP and/or DNS functionality), which may complicate the configuration process.

Moreover, while there may be many access points in a large subnet, these access points may belong to different organizations and may have a different controller in one or more other subnets. In these circumstances, it may be difficult to use the existing techniques to automatically connect an access point to a controller. Consequently, the existing controller discovery techniques may be frustrating for communication-network equipment providers, network operators, and for customers.

SUMMARY

Some embodiments of the present disclosure provide a method. The method may include receiving an indication of an authorization grant by a networking device; requesting, by the networking device, an authorization token from a remote authorization service; obtaining, by the networking device and from the remote authorization service, the requested authorization token; and transmitting, by the networking device and to a device registrar, a request to register the networking device with the device registrar. The request may include the authorization token.

Some embodiments of the present disclosure provide a method that may include receiving, by an authorization service associated with a device registrar, a request for an authorization token from a remote networking device; generating, by the authorization service and based on the request, a first authorization token; receiving, from the device registrar, a second authorization token received from the remote networking device; verifying the second authorization token; and registering the remote networking device with the device registrar.

Some embodiments of the present disclosure provide a method that may include registering a first networking device with a device registrar, which may include both authenticating a network address of the first network device and confirming that the first networking device may be authorized to register with the device registrar. The method may include receiving, by the device registrar and from a second networking device, a unique identifier associated with the second networking device; identifying, using the unique identifier, the first networking device registered with the device registrar; and transmitting, to the second networking device, details associated with the first networking device stored in the device registrar.

The present disclosure is not limited to the above-described embodiments, and other aspects and embodiments, including other methods as well as systems and devices, are described herein.

BRIEF DESCRIPTION OF THE FIGURES

Like reference numerals refer to corresponding parts throughout the drawings. Moreover, multiple instances of the same part may be designated by a common prefix separated from an instance number by a dash.

DETAILED DESCRIPTION

Some aspects of the present disclosure provide an efficient and secure mechanism by which an access point may discover a controller. The controller may first be registered with a device registration platform prior to an initial startup or operation of the access point. The controller may be authenticated and/or authorized via one or more processes and methods described herein. As a result of an authorization process, the controller may receive an authorization token from an authorization service. The controller may provide the authorization token, along with a network address of the controller and a list of identifiers corresponding respectively to access points, to a device registrar. The controller may also provide authentication details, such as a certificate signed by a certificate authority, indicating that the network address of the controller is truthful. The device registrar may confirm the validity of the authorization token, and if valid register the controller with the device registrar. The registered controller may then be associated with the access points that correspond to the identifiers. At startup, or during a controller discovery process, each access point may contact the device registrar and provide its identifier (e.g., a serial number or other unique identifier) to the device registrar. The device registrar may then return the network address of the previously-registered controller to the access point, and the access point may then use the network address in an attempt to discover and contact the controller.

The devices, methods, and systems according to the present disclosure provide a more efficient and less time-consuming way to connect controllers with access points, such as in a large-scale deployment. Also, the devices, methods, and systems according to the present disclosure provide a secure mechanism for connecting controllers with access points, in that in some embodiments, the controller is both authenticated (e.g., the network address of the controller is verified to be truthful) and authorized (e.g., a network operator has confirmed that the controller is permitted to register with the device registrar). This reduces potential security risks that may adversely impact the network.

Figure 1:
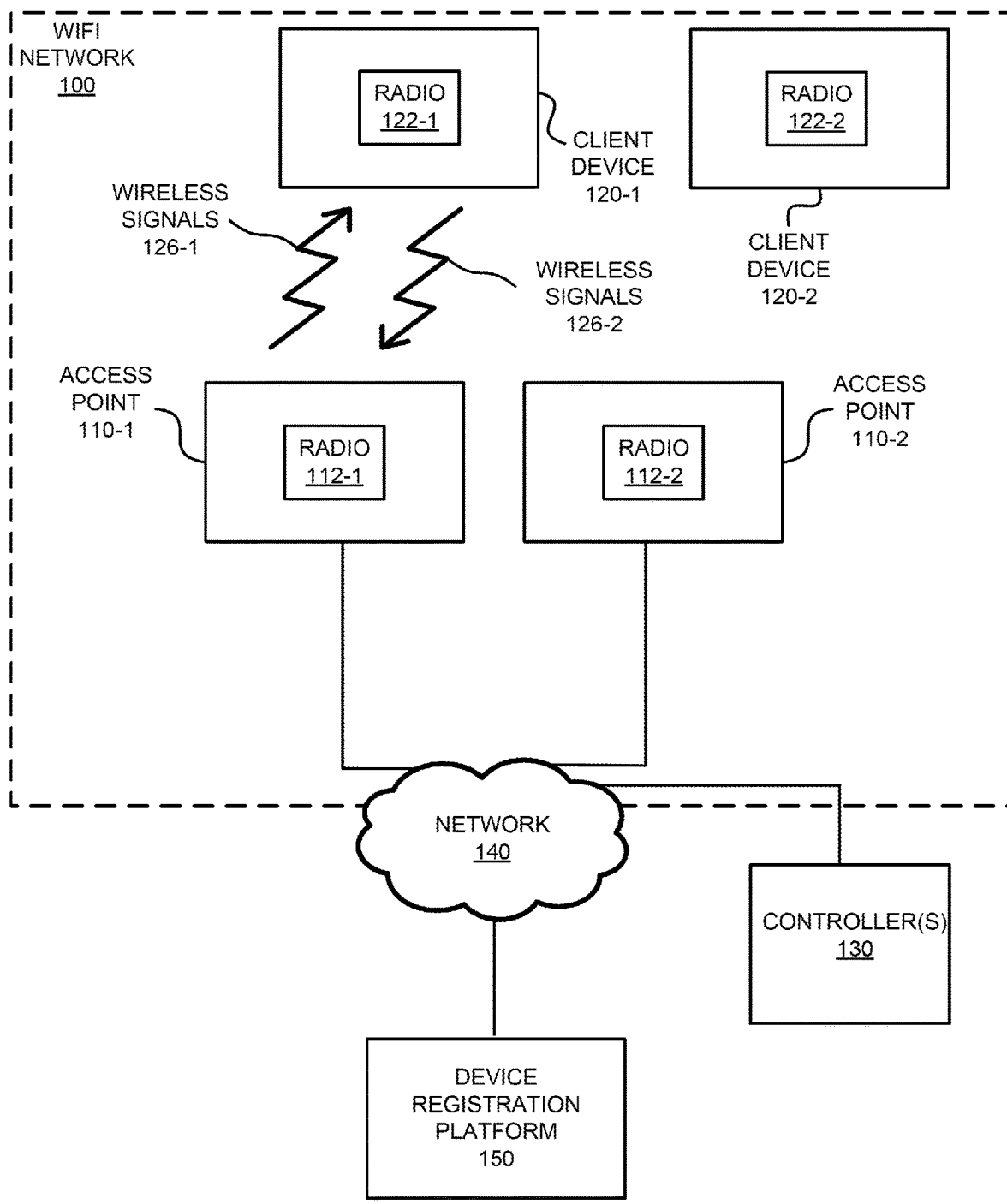
FIG. 1 is a block diagram illustrating an example of a system according to some embodiments of the present disclosure.

FIG. 1 is a block diagram illustrating a very simple, example system 10 including a WiFi network 100 in which the controller discovery techniques according to embodiments of the present inventive concepts may be practiced. As shown in FIG. 1, the WiFi network 100 may include one or more access points 110, one or more client devices 120 (such as cellular telephones, computers, tablets, printers and a wide range of other WiFi-capable electronic devices), one or more controllers 130, and a device registration platform 150.

The access points 110 may communicate with one or more of the client devices 120 using wireless communication that is compatible with an IEEE 802.11 standard. Thus, the wireless communication may occur in, for example, the 2.4 GHz frequency band, the 5 GHz frequency band, the 6 GHz frequency band, and/or the 60 GHz frequency band. However, other frequency bands may be used, and it will be appreciated that future versions of the IEEE 802.11 standards may operate in additional or different frequency bands. While not shown in FIG. 1, the WiFi network 100 may include additional components or electronic devices, such as, for example, switches and/or routers.

The access points 110 and the client devices 120 may communicate with each other via wireless communication. The access points 110 and the client devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc.

As described further below with reference to FIG. 6, the access points 110, client devices 120, the controllers 130, and the device registration platform 150 may include subsystems, such as a networking subsystem, a memory subsystem and a processor subsystem. The networking subsystems may include radios that are used to wirelessly communicate with each other. For example, the access points 110 may include at least one radio 112 that is configured to transmit and receive signals in a frequency band. In some embodiments, the at least one radio 112 may include a first radio configured to transmit and receive signals in a frequency band (e.g., the 2.4 GHz frequency band), and a second radio that is configured to transmit and receive signals in a second frequency band (e.g., the 5 GHz frequency band). Similarly, the client devices likewise may include at least one radio 122, and in some embodiments may include a first radio that is configured to transmit and receive signals in the first frequency band (e.g., the 2.4 GHz frequency band), and a second radio that is configured to transmit and receive signals in the second frequency band (e.g., the 5 GHz frequency band).

As can be seen in FIG. 1, wireless signals 126-1 (represented by a jagged line) are transmitted from the access point 110-1 (and the at least one radio 112 thereof) to client device 120-1. These wireless signals are received by the at least one radio 122 in the client device 120-1. Likewise, wireless signals 126-2 (represented by a jagged line) are transmitted from the client device 120-1 (and the at least one radio 122 thereof), and may be received by the at least radio 112 of the access point 110-1. The wireless signals 126-1, 126-2 may comprise frames or packets that are transmitted between the client device 120-1 and the access point 110-1.

The access points 110 may also communicate with the one or more controllers 130 via a network 140 (discussed below)

and/or one or more dedicated communication links (not shown). The controllers 130 may control various aspects of the operation of the access points 110, and by extension, the WiFi network 100. For example, the controller 130 may provide configuration management, user authentication, events/alarms reports, statistics reports, and/or monitoring of access-point functions. The one or more controllers 130 may be at the same location as the other components in WiFi network 100 or may be located remotely (e.g., cloud-based controllers 130). The access points 110 may communicate with the controller(s) 130 or other services using wireless communications and/or using a wired communication protocol, such as a wired communication protocol that is compatible with an IEEE 802.3 standard (which is sometimes referred to as 'Ethernet'), e.g., an Ethernet II standard. The access points 110 may be physical access points or may be virtual or 'software' access points that are implemented on a computer or other electronic device.

The access points 110 may provide the client devices 120 access to one or more networks 140, which may be a local area network (LAN), campus area network (CAN), wide area network (WAN), metropolitan area network (MAN), and/or the Internet. For example, the access points 110 may provide (via the one or more networks 140) a communication path between the client device 120 and other devices available via the one or more network 140 and content can be bidirectionally transmitted therebetween. It will be appreciated that some access points 110 may only be connected to the network 140 through other access points 110 (e.g., in a mesh network implementation).

Figure 2:
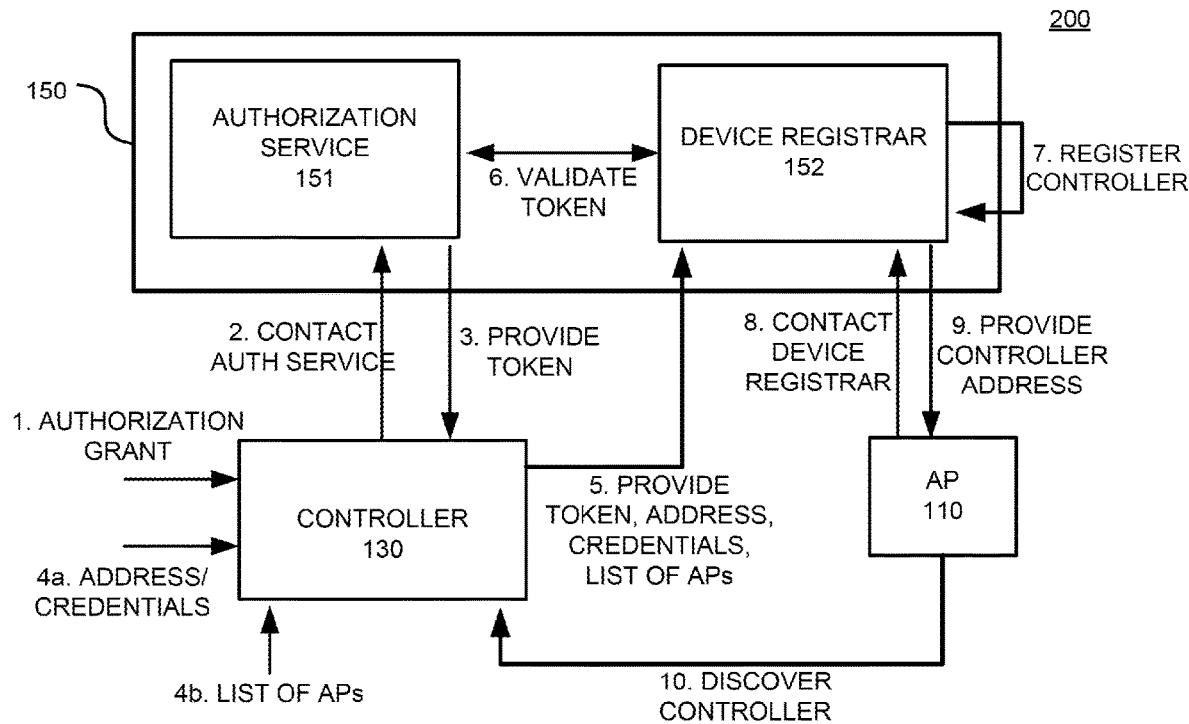
FIG. 2 is a block diagram illustrating example communication flows within a system according to some embodiments of the present disclosure.

As discussed above, some aspects of the present disclosure provide an efficient and secure mechanism by which an access point 110 may discover the controller 130, such as via a device registration platform 150. Referring now to FIG. 2, which is a block diagram illustrating example communication flows within a system according to some embodiments of the present disclosure, in some embodiments the device registration platform 150 may include an authorization service 151 and a device registrar 152.

The authorization service 151 may be configured to provide authorization functionality for devices enrolling or registering with the device registrar 152. In some embodiments, the authorization service 151 may receive an indication of an authorization grant from a user (e.g., an administrative user) associated with the controller 130 (Operation 1 of FIG. 2). For example, the authorization grant may be an authorized user indicating that the controller 130 is to register with the device registrar 152, and the indication of the authorization grant may be a request for an authorization token received by the authorization service 151 from the user associated with the controller 130.

In other words, based on receiving an authorization grant, the controller 130 may contact the authorization service 151 (Operation 2 of FIG. 2) and provide credentials or other information to the authorization service 151 that indicate it is proper for the controller 130 to request registration with the device registrar 152. The credentials may be in the form of authenticated user credentials (e.g., a username/password combination or other authenticating data).

The authorization service 151 may validate the credentials as part of generating an authorization token for the controller 130, and if the credentials are valid, generate and provide the authorization token to the controller 130 (Operation 3 of FIG. 2). In some embodiments, the authorization service 151 may be or may implement an authorization framework, such as an OAuth framework. For example, the controller 130 may be configured to request access to the device registrar 152, or a portion thereof. The controller 130 may be issued credentials to access the device registrar 152, or the portion thereof. The credentials may be in the form of an authorization token that may indicate which portion or portions of the device registrar 152 that the controller 130 may access, how long the controller 130 may access the portion(s), and so on. The authorization service may be configured to confirm that the controller 130 is approved to access the device registrar 152 (e.g., that the controller 130 is approved to receive an authorization token).

The controller 130 may then receive from a network administrator a network address for the controller 130, such as a fully qualified domain name (FQDN) and/or IP address. The controller 130 may also receive a set of network credentials authenticating that the controller is associated with the network address (Operation 4a of FIG. 2). The credentials may include authentication credentials, such as a certificate signed by a public certificate authority (CA). Such authentication credentials may be used to both identify the controller 130 and also validate that the purported network address of the controller 130 is correct and/or valid.

The controller 130 may also receive from a network administrator (either the above network administrator or a different administrator) a list of identifiers, each associated with a respective access point 110 (Operation 4b of FIG. 2). In some embodiments, each identifier may uniquely identify a respective access point 110. For example, an identifier may be a unique serial number of each access point 110, a MAC (Media Access Control) address of each access point 110, or so on.

In some embodiments, the controller 130 may receive the list of identifiers of access points 110, the network address and/or network credentials, and the authorization token in any order, e.g., a different order than the order illustrated in FIG. 2.

The controller 130 may then provide the authentication token, the network address and credentials, and the list of identifiers of access points to the device registrar 152 (Operation 5 of FIG. 2). In some embodiments, the device registrar 152 may include or be communicatively coupled with a database or other data store. The device registrar 152 may receive the authentication token, the network address, the network credentials, and the list of identifiers of access points and attempt to validate the authentication token with the authentication service 151 (Operation 6 of FIG. 2). For example, the device registrar 152 may pass the authentication token to the authentication service 151 and receive a confirmation that the authentication token is valid, or alternatively receive an indication that the authentication token is not valid, expired, and/or otherwise indicative that the controller 130 should not be registered.

In some embodiments, the device registrar 152 may also examine and/or review the network credentials provided by the controller 130 and ascertain that the controller 130 is authenticated, e.g., by the certificate and/or CA communicated from the controller.

If the authentication token is valid and/or the device registrar 152 confirms that the network credentials associated with the controller 130 are authentic, then the device registrar 152 may register the controller 130 therewith (Operation 7 of FIG. 2). The device registrar 152 may also associate the controller 130 and the network address and/or credentials thereof with each of the identifiers of the list of identifiers of access points 110.

At a subsequent time, a network administrator may setup an access point 110 that is to be controlled by the controller 130. The access point 110 may receive access to a network (e.g., network 140 of FIG. 1) and, via the network, contact the device registrar 152 (or more generally, the device registration platform 150) (Operation 8 of FIG. 2). The access point 110 may provide to the device registrar 152 the unique identifier of the access point 110. In response, the device registrar 152 may examine the database or data store, locate the registered controller 130 associated with the unique identifier of the access point 110, and transmit to the access point 110 details regarding the controller 130, such as the network address of the controller 130 (Operation 9 of FIG. 2). Using the received network address of the controller 130, the access point 110 may attempt to contact and/or discover the controller 130 (Operation 10 of FIG. 2). As a result, the controller 130 and the access point 110 may be capable of communication therebetween.

With reference to the above discussion of FIG. 2, the present disclosure is based in part on a recognition that automated discovery of a controller may create at least two different kinds of security risks. First, a malicious and/or unauthorized user may attempt to enroll a controller 130 with the device registrar 152; the authorization operations 1-3 of FIG. 2 prevent or reduce such unauthorized access by using authentication tokens to ensure that the controller 130 is in fact authorized to register with the device registrar 152. Second, a malicious user may attempt to register a controller (and have appropriate credentials or permission to do so) that is purposefully misidentified, or in other words a controller 130 that is not properly authenticated. The use of credentials, such as public certificates signed by a public CA prevent or reduce the occurrence of unauthenticated controllers 130 registering with the device registrar. It is noted that the two above-discussed security risks may appear together, but may also appear separately. Additionally, the present disclosure and the inventive concepts described herein are not limited to these risks, and the inventive concepts may address other security risks or other technical problems present in networking systems and/or computing devices.

Accordingly, as discussed above, in some embodiments, a controller 130 may be authenticated and/or authorized via one or more processes and methods described herein. As a result of an authorization process, the controller may receive an authorization token from an authorization service. The controller may provide the authorization token, along with a network address of the controller and a list of identifiers corresponding respectively to access points, to a device registrar. The controller may also provide authentication details, such as a certificate signed by a certificate authority, indicating that the network address of the controller is truthful.

Figure 3:
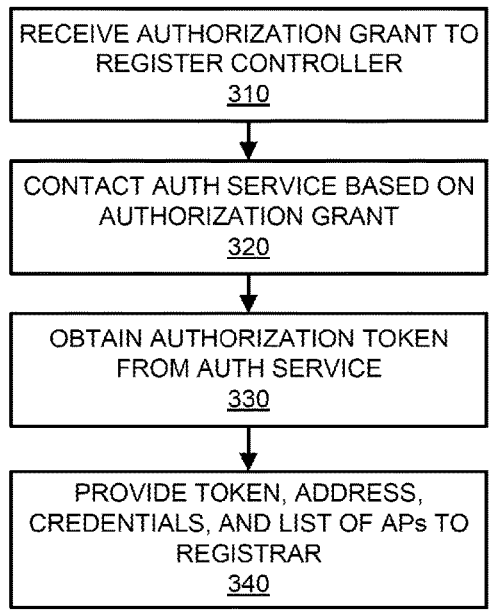
FIG. 3 is a flow diagram illustrating an example of a method of providing information from a controller to a device registration platform for registration of the controller with the device registration platform according to some embodiments of the present disclosure.

FIG. 3 is a flow diagram illustrating an example of a method of providing information from a controller to a device registration platform for registration of the controller with the device registration platform according to some embodiments of the present disclosure.

The controller 130 may receive an authorization grant indicating that the controller 130 is to register with the device registrar 152 (or more generally, the device registration platform 150) (block 310). For example, a network administrator may indicate that the controller 130 is to register with the device registrar 152.

Based on receiving the authorization grant, the controller 130 may contact the authorization service 151 and provide credentials or other information to the authorization service 151 that indicate it is proper for the controller 130 to request registration with the device registrar 152 (block 320). The credentials may be in the form of authenticated user credentials (e.g., a username/password combination or other authenticating data).

The authorization service 151 may validate the credentials as part of generating an authorization token for the controller 130. Accordingly, if the credentials are valid, the controller 130 may obtain an authorization token from the authorization service 151 (block 330).

The controller 130 may receive from a network administrator a network address for the controller 130, such as a fully qualified domain name (FQDN) and/or IP address. The controller 130 may also receive a set of network credentials authenticating that the controller is associated with the network address. The controller 130 may also receive from a network administrator (either the above network administrator or a different administrator) a list of identifiers, each associated with a respective access point 110. The controller 130 may then communicate the authorization token, the network address, the credentials associated with the network address, and the list of identifiers of access points 110 to the device registrar 152 (block 340).

Figure 4A:
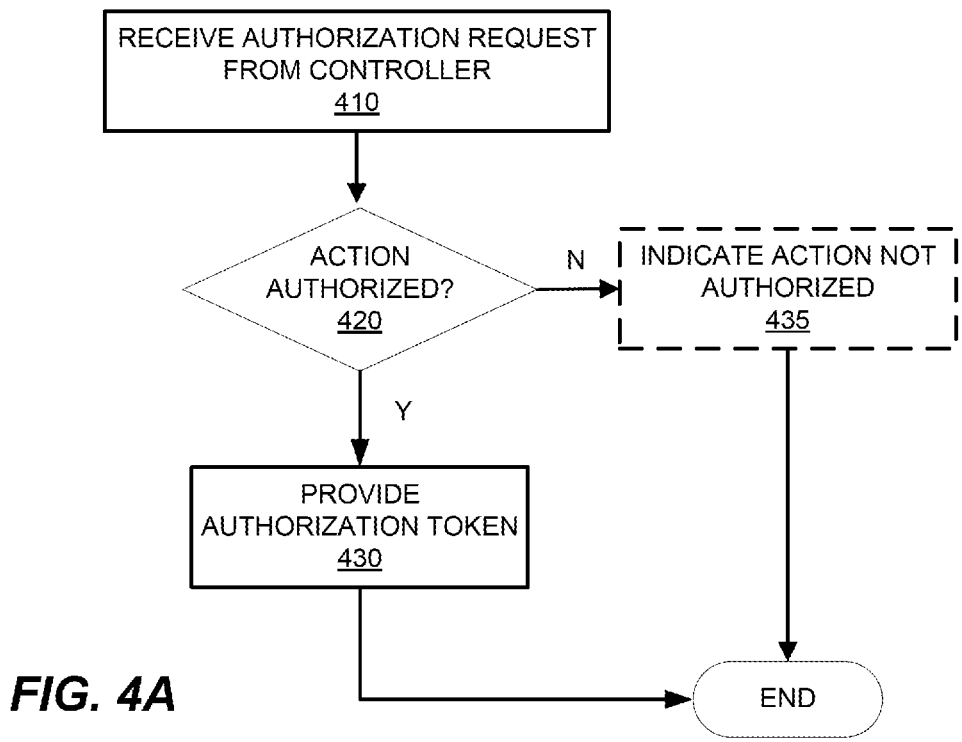
FIG. 4A is a flow diagram illustrating an example of a method of providing a controller with an authentication token according to some embodiments of the present disclosure.

FIG. 4A is a flow diagram illustrating an example of a method of providing a controller with an authentication token according to some embodiments of the present disclosure. As discussed above, the authorization service 151 may be configured to provide authorization functionality for devices enrolling or registering with the device registrar 152. The authorization service 151 may receive an indication of an authorization request from a user (e.g., an administrative user) associated with the controller 130 (block 410). For example, the authorization request may be in the form of an authorization grant from an authorized user indicating that the controller 130 is to register with the device registrar 152. Based on receiving an authorization grant, the controller 130 may decide or determine whether the controller 130 (or the administrative user) is authorized to register the controller 130 with the device registrar 152. (block 420). For example, the administrative user may provide credentials or other information to the authorization service 151, and the authorization service 151 may validate the credentials. If the credentials are valid ("Y" branch from block 420), then the authorization service 151 may generate and provide the authorization token to the controller 130 (block 430). Otherwise ("N" branch from block 420), and optionally, the authorization service 151 may indicate to the controller that registration is not authorized and/or that no authentication token will be provided (block 435).

Figure 4B:
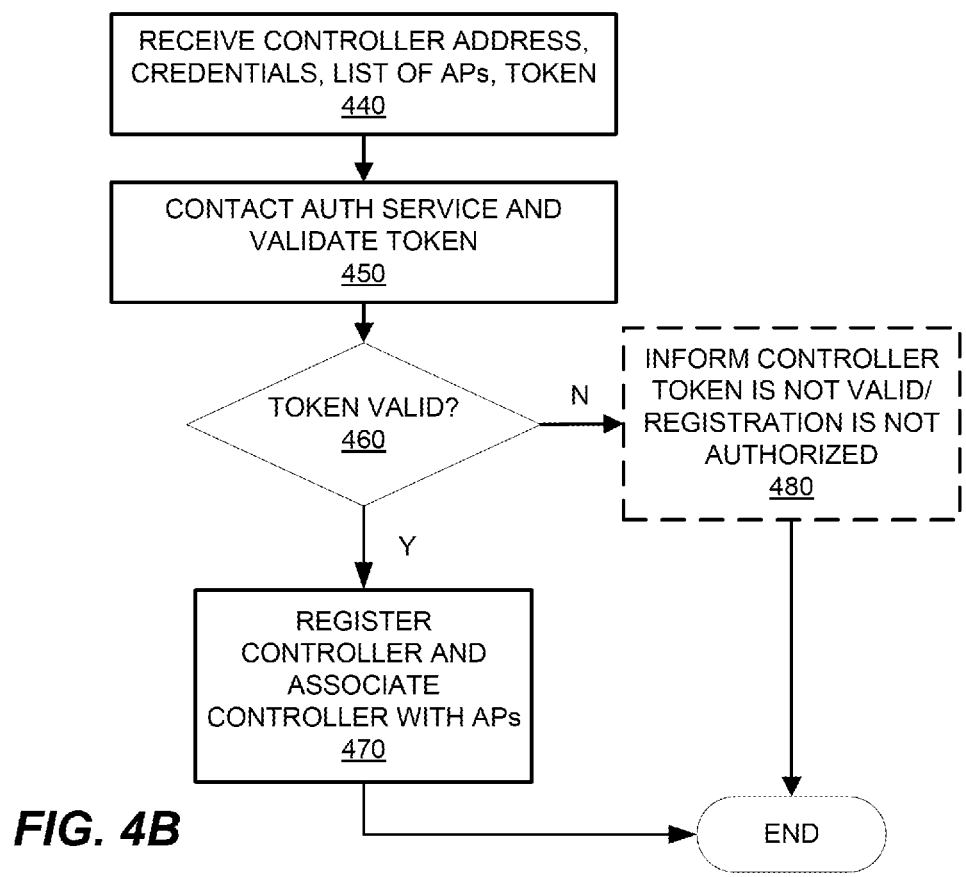
FIG. 4B is a flow diagram illustrating an example of a method of registering a controller with a device registration platform according to some embodiments of the present disclosure.

FIG. 4B is a flow diagram illustrating an example of a method of registering a controller with a device registration platform according to some embodiments of the present disclosure. In some embodiments, the device registrar 152 of the device registration platform 150 may receive the authentication token, the network address, the network credentials, and the list of identifiers of access points from the controller (block 440). The device registrar 152 may then attempt to validate the authentication token with the authentication service 151 (block 450). For example, the device registrar 152 may pass the authentication token to the authentication service 151 and receive an indication of a status of the authentication token from the authentication service 151 (block 460). In some embodiments, the authentication service 151 may compare the generated authentication token with the authentication token received from the controller 130. If the token is valid ("Y" branch from block 460), then the device registrar 152 may register the controller 130 therewith and associate the controller 130 with the access points 110 identified by the list of access points (block 470).

Otherwise ("N" branch from block 460), and optionally, the device registrar 152 may communicate an indication to the controller 130 that the authentication token is not valid, expired, and/or otherwise indicate that the controller 130 will not be registered (block 480).

In some embodiments, while deciding whether to register the controller 130, the device registrar 152 may also examine and/or review the network credentials provided by the controller 130 and ascertain that the controller 130 is authenticated, e.g., by the certificate and/or CA communicated from the controller.

Figure 5:
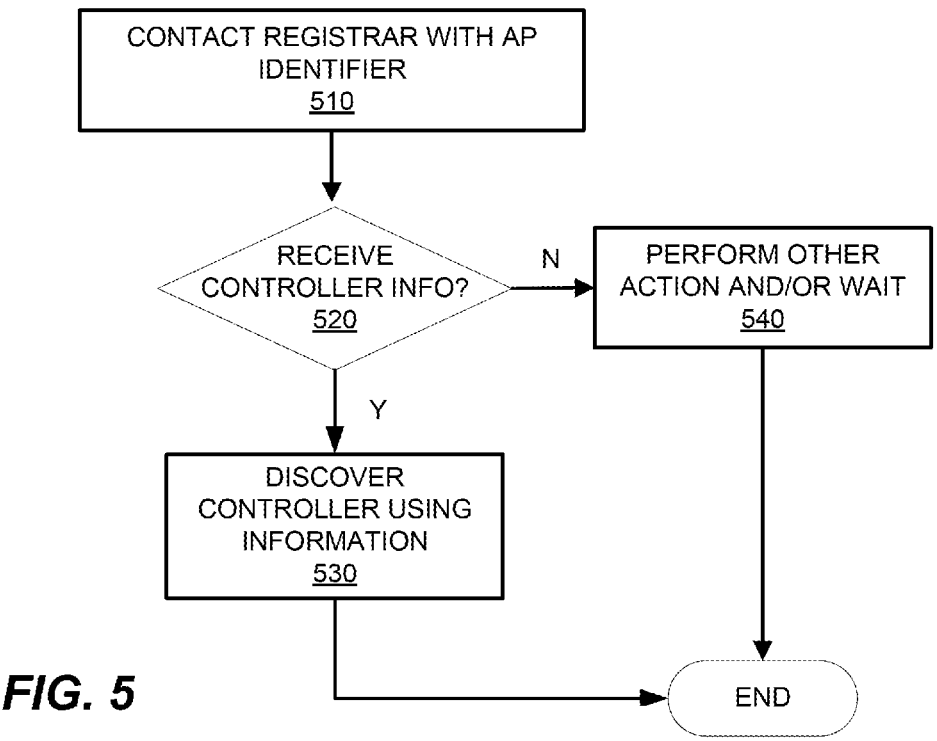
FIG. 5 is a flow diagram illustrating an example of a method of an access point obtaining controller information from a device registration platform according to some embodiments of the present disclosure.

FIG. 5 is a flow diagram illustrating an example of a method of an access point obtaining controller information from the device registration platform according to some embodiments of the present disclosure. As discussed above, in some embodiments, a network administrator may setup an access point 110 that is to be controlled by the controller 130. The access point 110 may receive access to a network (e.g., network 140 of FIG. 1) and, via the network, contact the device registrar 152 (or more generally, the device registration platform 150) (block 510). In response, the device registrar 152 may examine the database or data store, locate the registered controller 130 associated with the unique identifier of the access point 110, and transmit to the access point 110 details regarding the controller 130, such as the network address of the controller 130. The access point 110 may detect or determine whether controller information has been received (block 520). If controller information is received ("Y" branch from block 520), then the access point 110 may use the received network address of the controller 130 and may attempt to contact and/or discover the controller 130 (block 530). Otherwise ("N" branch from block 520), the access point 110 may perform another action in an attempt to discover and/or connect with the controller 130, and/or wait a predetermined period of time before contacting the device registrar 152 again.

As discussed above, the devices, methods, and systems according to the present disclosure provide a more efficient and less time-consuming way to connect controllers with access points, such as in a large-scale deployment. Also, the devices, methods, and systems according to the present disclosure provide a secure mechanism for connecting controllers with access points, in that in some embodiments, the controller is both authenticated (e.g., the network address of the controller is verified to be truthful) and authorized (e.g., a network operator has confirmed that the controller is permitted to register with the device registrar). Although access points 110 and/or controllers 130 are discussed, it is to be understood that the present disclosure is not limited thereto, and other devices (e.g., network switches, network routers) may register with the device registration platform 150. Enabling such devices to register with the device registration platform 150 and/or to utilize information stored in the device registration platform may provide beneficial improvements to the operation of networking systems and/or the devices thereof.

Figure 6:
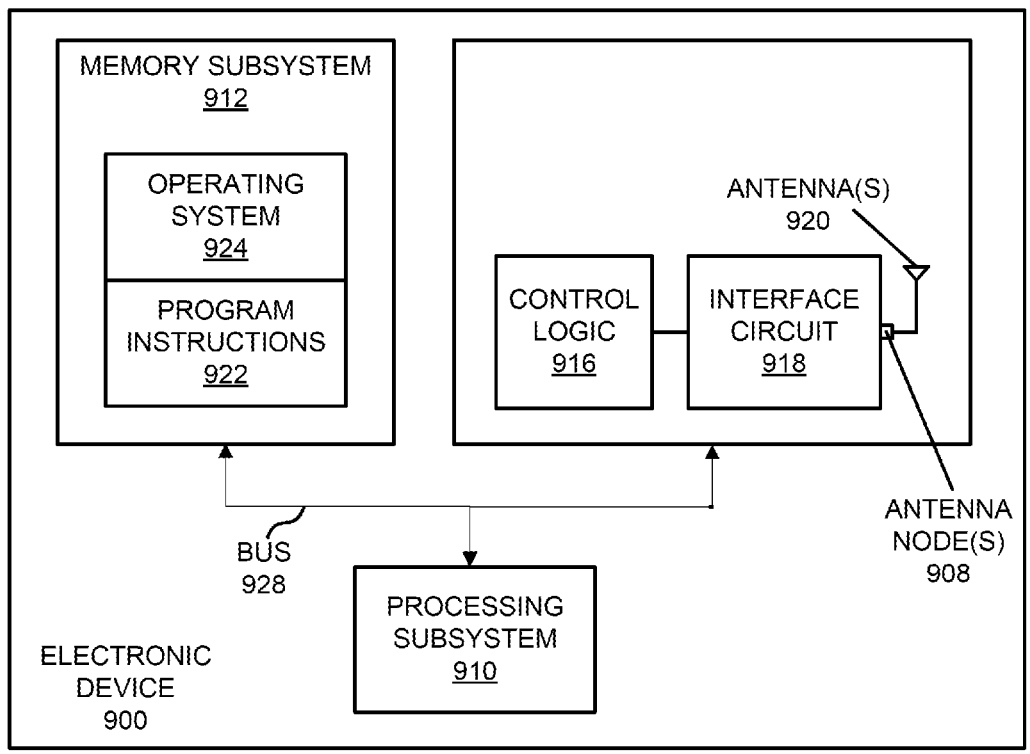
FIG. 6 is a block diagram of an electronic device (e.g., an access point or a client device) according to embodiments of the present disclosure.

FIG. 6 is a block diagram illustrating an electronic device 900 in accordance with some embodiments. The electronic device 900 may be, for example, one of the access points 110, one of the client devices 120, the controllers 130, or the device registrar 150 illustrated in FIG. 1. The electronic device 900 includes a processing subsystem 910, a memory subsystem 912, and a networking subsystem 914. Processing subsystem 910 includes one or more devices configured to perform computational operations. Memory subsystem 912 includes one or more devices for storing data and/or instructions. In some embodiments, the instructions may include an operating system and one or more program modules which may be executed by processing subsystem 910.

Networking subsystem 914 includes one or more devices configured to couple to and communicate on a wired and/or wireless network (i.e., to perform network operations), including: control logic 916, an interface circuit 918 and possibly one or more antennas 920 (or antenna elements). While FIG. 10 includes an antenna 920, in some embodiments electronic device 900 includes one or more nodes, such as nodes 908, e.g., a connector, which can be coupled to one or more antennas 920 that are external to the electronic device 900. Thus, electronic device 900 may or may not include the one or more antennas 920. Networking subsystem 914 includes at least a networking system based on the standards described in IEEE 802.11 (e.g., a Wi-Fi networking system).

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting frames and/or scanning for frames transmitted by other electronic devices.

Processing subsystem 910, memory subsystem 912, and networking subsystem 914 are coupled together using bus 928. Bus 928 may include an electrical, optical, and/or electro-optical connection that the subsystems can use to communicate commands and data among one another.

Electronic device 900 can be (or can be included in) any electronic device with at least one network interface. For example, electronic device 900 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

The operations performed in the communication techniques according to embodiments of the present disclosure may be implemented in hardware or software, and in a wide variety of configurations and architectures. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

Embodiments of the present disclosure have been described above with reference to the accompanying drawings, in which embodiments of the inventive concepts disclosed herein are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A method, comprising:
 receiving an indication of an authorization grant by a networking device;
 requesting, by the networking device, an authorization token from a remote authorization service;
 obtaining, by the networking device and from the remote authorization service, the authorization token that was requested; and
 transmitting, by the networking device and to a device registrar, a request to register the networking device with the device registrar, wherein the request includes the authorization token.

2. The method of claim 1, wherein the networking device is a first networking device, and wherein the request to register the first networking device with the device registrar includes a list of unique identifiers each associated with a respective second networking device.

3. The method of claim 2, wherein the first networking device is a network controller, and wherein each second networking device is a wireless access point networking device.

4. The method of claim 2, wherein the list of unique identifiers comprises respective identifiers associated with respective access points.

5. The method of claim 4, wherein the respective identifiers comprise a unique serial numbers of the respective access points or a MAC (Media Access Control) address of the respective access points.

6. The method of claim 1, wherein the request to register the networking device with the device registrar includes a networking address associated with the networking device.

7. The method of claim 6, wherein the request to register the networking device with the device registrar includes a certificate authenticating the networking address associated with the networking device.

8. The method of claim 7, wherein the request to register the networking device with the device registrar identifies a certificate authority that authenticates the certificate.

9. The method of claim 1, further comprising:
 providing, by the networking device, the authorization token, a network address and credentials, and a list of identifiers of access points to the device registrar.

10. A method, comprising:
 receiving an indication of an authorization grant by a network controller;
 requesting, by the networking controller, an authorization token from a remote authorization service;
 obtaining, by the network controller and from the remote authorization service, the authorization token that was requested; and
 transmitting, by the network controller and to a device registrar, a request to register the network controller with the device registrar, wherein the request includes the authorization token.

11. The method of claim 10, wherein the request to register the network controller with the device registrar includes a list of unique identifiers each associated with a respective wireless access point.

12. The method of claim 11, wherein the network controller, and wherein each second networking device is a wireless access point networking device.

13. The method of claim 11, wherein the list of unique identifiers comprises respective identifiers associated with respective access points.

14. The method of claim 10, wherein the request to register the network controller with the device registrar includes a networking address associated with the network controller.

15. The method of claim 14, wherein the request to register the network controller with the device registrar includes a certificate authenticating the networking address associated with the network controller.

16. The method of claim 15, wherein the request to register the network controller with the device registrar identifies a certificate authority that authenticates the certificate.

17. The method of claim 10, further comprising:
 providing, by the network controller, the authorization token, a network address and credentials, and a list of identifiers of access points to the device registrar.

18. A method, comprising:
 receiving an indication of an authorization grant by a networking device;

requesting, by the networking device, an authorization token from a remote authorization service;
obtaining, by the networking device and from the remote authorization service, the authorization token; and
transmitting, by the networking device, to a device registrar, a request to register the networking device with the device registrar, wherein the request includes the authorization token,
wherein the request to register the networking device with the device registrar includes a networking address associated with the networking device,
wherein the request to register the networking device with the device registrar includes a certificate authenticating the networking address associated with the networking device, and
wherein the networking device is a first networking device, and wherein the request to register the first networking device with the device registrar includes a list of unique identifiers each associated with a respective second networking device.

* * * * *